US012728803B2

(12) United States Patent
Hwang

(10) Patent No.: US 12,728,803 B2
(45) Date of Patent: Sep. 8, 2026

(54) COVER FOR BUMPER OPENING

(71) Applicant: NIFCO INC., Yokosuka (JP)

(72) Inventor: Jemin Hwang, Yokosuka (JP)

(73) Assignee: NIFCO INC., Yokosuka (JP)

( * ) Notice: Subject to any disclaimer, the term of this patent is extended or adjusted under 35 U.S.C. 154(b) by 324 days.

(21) Appl. No.: 18/563,679

(22) PCT Filed: Jul. 22, 2022

(86) PCT No.: PCT/JP2022/028493
§ 371 (c)(1),
(2) Date: Nov. 22, 2023

(87) PCT Pub. No.: WO2023/021932
PCT Pub. Date: Feb. 23, 2023

(65) Prior Publication Data

US 2024/0270182 A1 Aug. 15, 2024

(30) Foreign Application Priority Data

Aug. 19, 2021 (JP) ................................ 2021-133863

(51) Int. Cl.
*B60R 13/04* (2006.01)
*B60R 19/18* (2006.01)

(52) U.S. Cl.
CPC ...... *B60R 13/04* (2013.01); *B60R 2019/1886* (2013.01)

(58) Field of Classification Search
CPC . B60R 13/04; B60R 2019/1886; B60R 19/02; B60R 13/0237; B60R 13/275;

(Continued)

(56) References Cited

U.S. PATENT DOCUMENTS 8,251,414 B2 * 8/2012 Brown .................... B60R 19/48 293/102
2011/0088228 A1 4/2011 Mineshima et al.

FOREIGN PATENT DOCUMENTS

JP S57-159548 U 10/1982
JP S58-178511 U 11/1983

(Continued)

OTHER PUBLICATIONS

English translation of JP2011168175A; https://translationportal.epo.org; Dec. 29, 2025 (Year: 2025).*

(Continued)

*Primary Examiner* — Roger L Pang
(74) *Attorney, Agent, or Firm* — HAUPTMAN HAM, LLP

(57) ABSTRACT

A cover for a bumper opening, for closing the bumper opening formed in a bumper of a vehicle includes a cover main body, a first protrusion provided on one side of the cover main body and configured to be introduced into the opening, and a second protrusion provided on another side opposing the one side of the cover main body and configured to be introduced into the opening. The first protrusion includes a deformable portion which is deformably made, and a support portion for the deformable portion, and by an elastic deformation of the deformable portion to the another side by contacting the deformable portion to a hole edge of the opening, the second protrusion is closely contacted to the hole edge of the opening, and the cover main body is contacted to the bumper.

5 Claims, 10 Drawing Sheets

(58) Field of Classification Search
CPC ........... B60R 2013/0293; F16B 5/0635; F16B 5/0664; F16B 21/08; F16B 5/06
USPC ........................................................ 296/191
See application file for complete search history.

(56) References Cited

FOREIGN PATENT DOCUMENTS

| | | | | |
|---|---|---|---|---|
| JP | H10329629 | A | * | 12/1998 |
| JP | 2001-294105 | A | | 10/2001 |
| JP | 2010-202088 | A | | 9/2010 |
| JP | 2011-084168 | A | | 4/2011 |
| JP | 2011-168175 | A | | 9/2011 |
| JP | 2014091459 | A | * | 5/2014 |

OTHER PUBLICATIONS

English translation of JPH10329629A; https://translationportal.epo.org; Dec. 29, 2025 (Year: 2025).*
JP2006188082A and English translation; Fukushima; Jul. 20, 2006 (Year: 2025).*
English translation of JP2014091459A; https://translationportal.epo.org; Dec. 29, 2025 (Year: 2025).*
English translation of JP2010202088A; https://translationportal.epo.org; Dec. 29, 2025 (Year: 2025).*
PCT/ISA/210, "International Search Report for PCT International Application No. PCT/JP2022/028493," Sep. 13, 2022.
Japan Patent Office, "Office Action for Japanese Patent Application 2021-133863", May 8, 2024, 6 pp.
China Patent Office, First Office Action for Chinese Patent Application No. 202280051092.9 dated Mar. 19, 2026; 12 pp.

* cited by examiner

COVER FOR BUMPER OPENING

FIELD OF THE INVENTION

The present invention relates to an improvement of a cover attached to a bumper of a vehicle, such as an automobile, and closing an opening formed in the bumper.

BACKGROUND TECHNOLOGY

As a cover for removably closing an opening formed in a bumper, there is a Patent Document 1.

The cover disclosed in the Patent Document 1 includes claw portions in left and right, and is attached to the bumper by engaging the claw portions in an opening of the bumper. When it is required to remove the cover, a tip of a minus driver is inserted into a space between the opening portion and the cover, and the cover is moved to an upper side. By doing so, an inclined face at an upper side of the cover is slidably contacted to an inclined face of the opening to thereby deform the cover, and by the deformation, a force in a removing direction is applied to the claw portion to thereby disengage the engagement.

PRIOR ART TECHNOLOGY DOCUMENT

Patent Document

Patent Document 1: Japanese Patent Publication No. 2010-202088

SUMMARY OF THE INVENTION

Problems to be Solved by the Invention

The cover disclosed in the Patent Document 1 has a structure requiring the above deformation in removing the cover, and it is difficult to adjust a force required to remove the cover, such as a force required to remove the cover is liable to be excessive. Also, in removing the cover, contact between the cover and the bumper by the force is indispensable, so that a damage at lease occurs. This point is stated in the Patent Document 1 (paragraph 0027 of the Patent Document 1).

The main point to be solved in the invention is that in this kind of a cover, a removable of the cover can be easily and properly made.

Means for Solving the Problems

In order to solve the problems, in the present invention, a cover for a bumper opening, for closing the bumper opening formed in a bumper of a vehicle, comprises:

a first protrusion provided on one side of a cover main body and introduced into the opening, a second protrusion provided on another side opposing the one side of the cover main body and introduced into the opening, wherein the first protrusion includes an easily deformable portion which is easily deformably made, and a support portion for the easily deformable portion, and by an elastic deformation of the easily deformable portion to the another side by contacting the easily deformable portion to a hole edge of the opening, the second protrusion is closely contacted to the hole edge of the opening, and the cover main body is contacted to the bumper.

In the above structure, an attachment state of the cover to the bumper becomes stable. Also, in detaching the cover from the bumper, an end of a tool, such as a driver, is inserted to a space between the another side of the cover main body and the opening, and the cover main body is pushed to a direction against urging of the easily deformable portion, so that the second protrusion is taken out from the opening, and then, the first protrusion is taken out from the opening. In this structure, in removing the cover, the main body is not required to be largely deformed. Also, it is not required to push the cover main body to the bumper with an excess force. Further, the invention has a feature that the force required for pushing can be easily tuned by simply changing the thickness and the shape of the easily deformable portion without changing other structure.

In one of the configuration, the support portion of the first protrusion includes a base portion facing an outer face to the hole edge of the opening, and a disengagement prevention portion which is located to face an inner face of the bumper to become disengagement prevention from the bumper.

In another configuration of the invention, also, the easily deformable portion of the first protrusion is made to an arm piece which extends in an inclined manner from the disengagement prevention portion of the support portion toward the base portion so that a free end is located to face the base portion.

One configuration of the invention is that the second protrusion is provided with an engagement portion relative to the hole edge, the engagement portion opposing the hole edge of the opening.

Advantages of the Invention

In accordance with the present invention, it is possible to remove the cover from the bumper without deforming the cover main body in a configuration without causing a damage to the bumper, and such a removable can be made easily and properly.

EMBODIMENTS TO CARRY-OUT THE INVENTION

Figure 1:
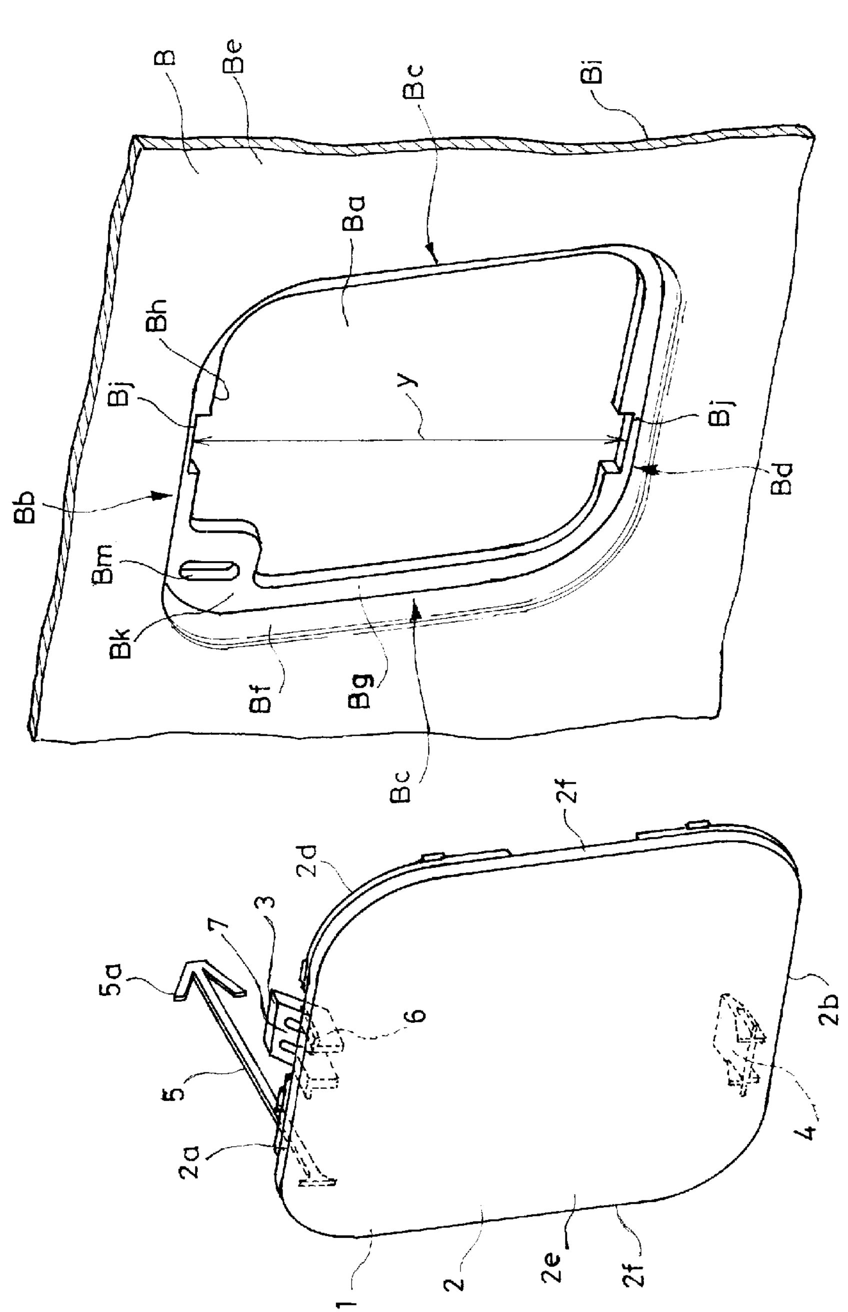
FIG. 1 is a perspective view of important parts of a cover and a bumper according to one embodiment of the invention.
Figure 2:
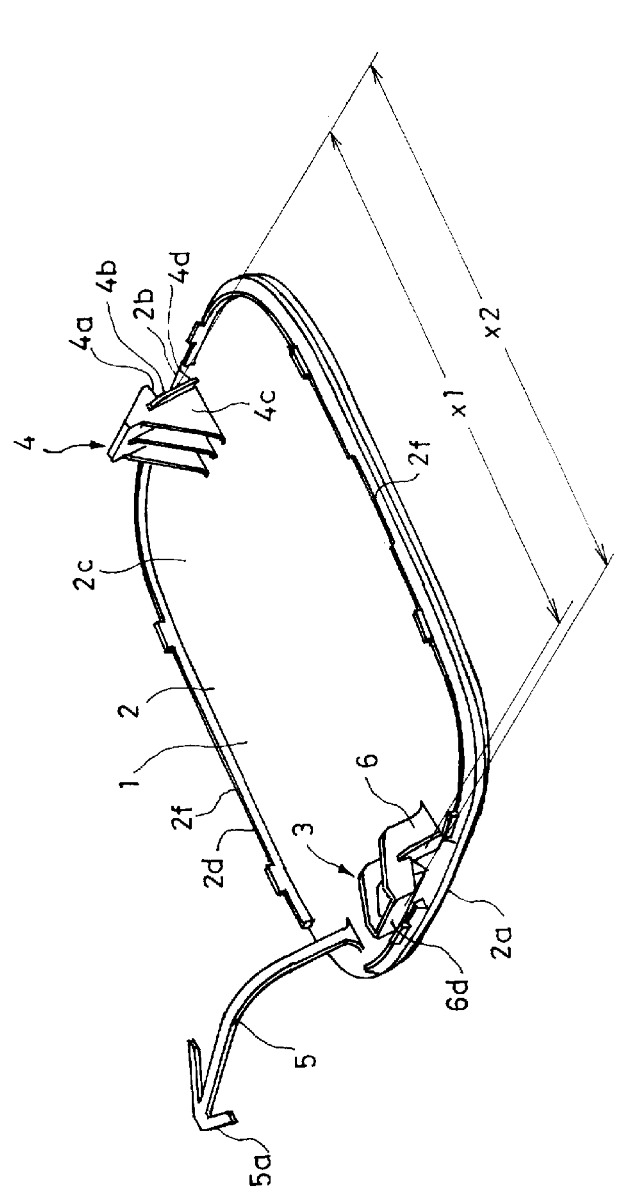
FIG. 2 is a perspective view of the cover, showing the cover in a direction opposite to FIG. 1.

Hereinafter, a typical embodiment of the invention will be explained with reference to FIGS. 1 to 10. A cover 1 according to the configuration of the embodiment is attached to a bumper B of a vehicle, such as an automobile, and closes an opening Ba formed in the bumper B. The cover 1 has a structure such that the cover 1 is removable, and after removable, the cover is again attachable to the bumper B. Typically, the cover 1 closes the opening Ba formed in the bumper which faces a hook (not shown) for pulling a vehicle when the hook is not used, and when the hook is used, the cover is removed from the bumper B, so that the hook is used through the opening Ba.

The cover 1 comprises a cover main body 2, a first protrusion portion 3, and a second protrusion portion 4. The cover 1 is a synthetic molded product, so that desired elastic deformable characteristics can be easily and properly applied to an easily deformable portion 7, explained later, of the first protrusion portion 3.

The cover main body 2 is a plate body having a contour aligning to the opening Ba. In the illustrated embodiment, in a state where the bumper B is seen from a front side, the opening Ba has a contour with a square shape which includes an upper side Bb, left and right sides Bc, and a lower side Bd, with four rounded corners, in particular a contour with rhombus. The cover main body has a contour similar to the contour of the opening Ba. When the cover 1 is attached to the bumper B such that one side 2*a* of the cover body 2 follows the upper side of the opening Ba, and the other side 2*b* of the cover body 2 follows a lower side of the opening Ba, the opening Ba is closed by the cover main body 2 in a state where a small space is formed between the opening Ba and the cover main body 2.

In the illustrated embodiment, inside the opening Ba, a surrounding edge Bg is formed to form a surrounding step with respect to an outer face Be of the bumper B. In the illustrated embodiment, an easy deformation portion 7, explained later, of the first protrusion portion 3 contacts the surrounding edge Bg wherein a protrusion edge Bh of the surrounding edge Bg becomes an hole edge Baa of the opening Ba, and an elastic deformation occurs toward a center of the opening Ba.

In the illustrated embodiment, in an inner face 2*c* (a face positioned to face the same direction as the inner face Bi of the bumper B in a state where the cover 1 is attached to the bumper B), except for portions where the first protrusion portion 3 and the second protrusion portion 4 are formed, protrusions 2*d* surrounding an edge of the cover main body 2 are formed. A distance between a protrusion end of the protrusion 2*d* and the outer face 2*e* of the cover main body 2 is equal to a distance between the surrounding edge Bg and the outer face Be of the bumper B. In a state where the surrounding edge Bg contacts the protrusion 2*d*, the cover 1 is attached to the bumper B. In the attached condition, the outer face 2*e* of the cover main body 2 and the outer face Be of the bumper B become the same faces (refer to FIG. 8 and FIG. 10).

Incidentally, in the illustrated embodiment, in the centers of the upper edge Bb and the lower edge Bd of the opening Ba, cutouts are formed in the surrounding edge Bg to thereby form narrow width portions Bj. The first protrusion 3 and the second protrusion 4 are introduced to the inner face Bi side of the bumper B through the cutouts forming the narrow width portions. Also, in the illustrated embodiment, in one corner near the upper edge Bb of the opening Ba, a wide width portion Bk is formed in the surrounding edge Bg, and in the wide width portion Bk, a long hole Bm is formed. In the illustrated embodiment, the cover 1 includes a connection member 5 in a form of a string having one end integrated at a corner portion where the one side 2*a* and one of the left and right edges 2*f* contact, and an engagement portion 5*a* in a form of an anchor at a second end. In the connection member 5, the engagement portion 5*a* is elastically deformed to enter into the long hole Bm, and thereafter, the engagement portion 5*a* elastically returned is caught at a face of the surrounding edge Bg opposing the same side as the inner face Bi of the bumper B. Accordingly, even if the cover 1 is removed from the bumper B, the cover 1 is not completely separated from the bumper B by the connection member 5.

The first protrusion 3 is structured to be formed at the one side 2*a* of the cover main body 2 and introduced into the opening Ba. In the illustrated embodiment, the first protrusion 3 is structured to project from the inner face 2*c* of the cover main body 2 integrally with the cover main body 2 in the middle of the left-right direction of the one side 2*a* of the cover main body 2.

Also, the second protrusion 4 is structured to be formed at the other side 2*b* opposing the one side 2*a* of the cover main body 2, and introduced into the opening Ba. In the illustrated embodiment, the second protrusion 4 is structured to project from the inner face 2*c* of the cover main body 2 integrally with the cover main body 2 in the middle of the left and right direction of the other side 2*b* of the cover main body 2.

Figure 3:
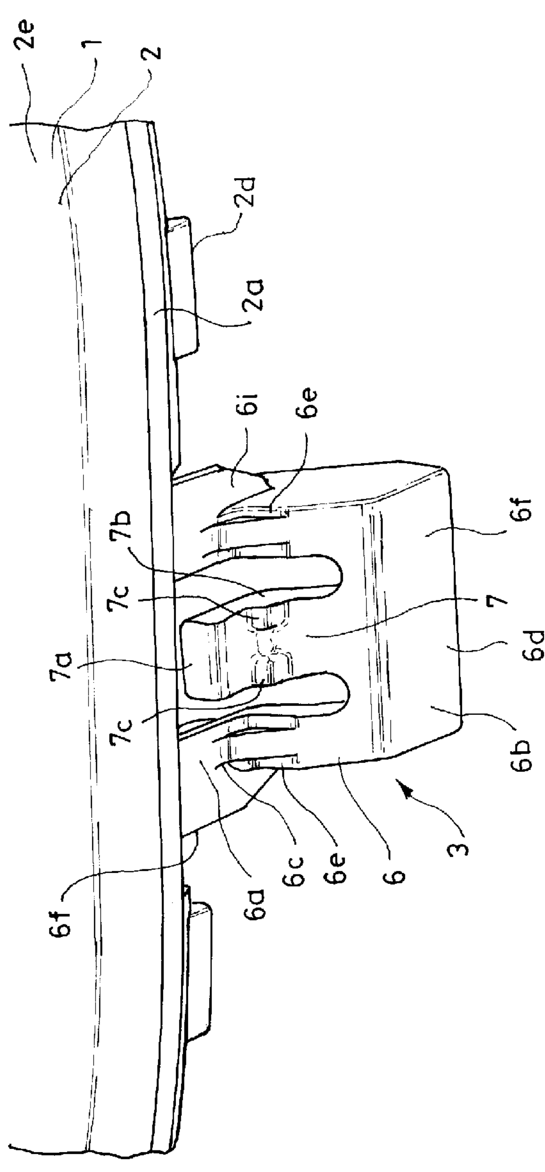
FIG. 3 is a perspective view of a forming portion of a first protrusion portion equipped in the cover.

Also, the first protrusion 3 includes an easily deformable portion 7 formed to be easily deformable, and a support portion 6 for the easily deformable portion 7 (refer to FIG. 3). And, by the elastic deformation of the easily deformable portion 7 to the other side 2*b* direction thereof due to contact of the easily deformable portion 7 to the hole edge Baa (in the illustrated embodiment, the protrusion edge Bh of the surrounding edge Bg in the cutout forming the narrow width portion Bj) of the opening Ba, the second protrusion 4 is closely contacted to the hole edge Baa of the opening Ba, and the cover main body 2 is closely contacted to the bumper B.

Accordingly, the attachment condition of the cover 1 to the bumper B in the direction (an upper-lower direction in FIG. 8 and FIG. 10) crossing the one side 2*a* and the other side 2*b* of the cover main body 2 becomes stable, and the attachment condition of the cover 1 to the bumper B in the direction (a left-right direction in FIG. 8 and FIG. 10) crossing the outer face 2*e* and the inner face 2*c* of the cover main body becomes stable, as well.

Also, in removing the cover 1 from the bumper B, an end of a tool, such as a driver, is inserted between the other side 2*b* of the cover main body 2 and the opening Ba, and the cover main body 2 is pushed to a direction (an upper direction in the illustrated embodiment) against urging of the easily deformable portion 7 to thereby pull out the second protrusion 4 from the opening Ba, and then, the first protrusion 3 can be pulled out from the opening Ba. In this removing, it is not necessary to largely deform the cover main body 2, and the cover main body 2 is not required to be pushed to the bumper B with a large force. Also, there is a characteristic such that a force necessary to the push can be tuned by only changing the thickness and the shape of the easily deformable portion 7 without changing the other structure.

In the configuration of the embodiment, the support portion 6 of the first protrusion 3 includes a base 6*a* with its outer face opposing the hole edge Baa of the opening Ba, and a disengagement prevention portion 6b positioned to face the inner face Bi of the bumper B and to become removable prevention from the bumper B.

Namely, the outer face 6c of the base 6a of the support portion 6 is located at a position closer to the center direction (a direction to the other side 2b) of the cover main body 2 than the one side 2a. A distance x1 (refer to FIG. 2) between an outer face 6c of the base portion 6a of the support portion 6 and an outer face 4b under an engagement portion 4a of the second protrusion 4, explained later, is slightly smaller than a distance y (refer to FIG. 1) between a protrusion end Bh of the surrounding edge Bg near the upper edge Bb of the opening Ba and a protrusion end Bh of the surrounding edge Bg near the lower edge Bd of the opening Ba.

The disengagement prevention portion 6b extends from the protrusion end of the base 6a to a direction opposite to the center of the cover main body 2. An extending end 6d of the disengagement prevention portion 6b is located outer side than the one side 2a (refer to FIG. 1). Accordingly, a distance x2 (refer to FIG. 2) between the extending end 6d of the disengagement prevention portion 6b and the outer surface 4b under the engagement portion 4a of the second protrusion 4, explained later, is greater than a distance y (referrer to FIG. 1) between the protrusion end Bh of the surrounding edge Bg near the upper edge Bb of the opening Ba and the protrusion end Bh of the surrounding edge Bg near the lower edge Bd of the opening Ba.

More concretely, the base 6a projects in a direction substantially perpendicular to the inner face 2c of the cover main body. The disengagement prevention portion 6b extends in an inclined manner from the protrusion end of the base 6a such that as it comes closer to the extending end 6d of the disengagement prevention portion 6b, a distance to an imaginary plane including the inner face 2c of the cover main body 2 gradually increases.

Figure 4:
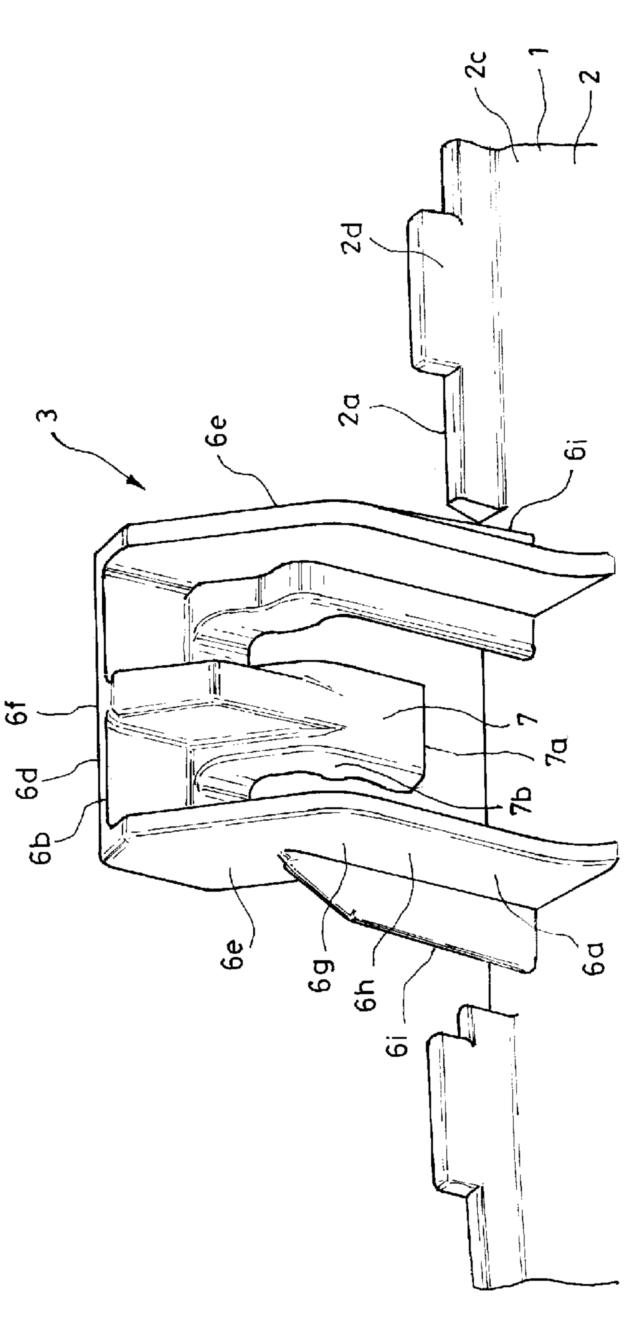
FIG. 4 is a perspective view of the forming portion of the first protrusion portion, showing the first protrusion portion in a direction opposite to FIG. 3.

In the illustrated embodiment, the support portion 6 has a structure such that first ends of the bent left and right leg portions 6e are integrated with the inner face 2c of the cover main body 2, and a connection portion 6f is formed between second ends of the left and right leg portions 6e (refer to FIG. 4). In the support portion 6, a portion between a bottom of each of the left and right leg portions 6e and the bent portion 6g becomes the base portion 6a, and a portion between the bent portion 6g and the second end in the left and right leg portions 6e becomes the disengagement prevention portion 6b (refer to FIG. 3)

On the other hand, in the illustrated embodiment, the easy deformation portion 7 of the first protrusion 3 becomes an arm piece extending in an inclined form from the disengagement prevention portion 6b of the support portion 6 to the base portion 6a to have a free end 7a near the base portion 6a.

A distance x3 (refer to FIG. 9) between an outer face (a face located at an upper side in FIG. 9 on a side opposite to the center portion of the cover main body 2) near the free end 7a contacting the hole edge Baa of the opening Ba in the easy deformation portion 7 and an outer face 4b under the engagement portion 4a of the second protrusion 4 is slightly bigger than the distance y (refer to FIG. 1) between the protrusion end Bh of the surrounding edge Bg near the upper edge Bh of the opening Ba and the protrusion end Bh of the surrounding edge Bg near the lower edge Bd of the opening Ba.

More concretely, the easy deformation portion 7 is arranged between the left and right legs 6e. The easy deformation portion 7 extends in an inclined manner similar to the inclination of the disengagement prevention portion 6b from the connection portion 6f. The easy deformation portion 7 has a shape, near the free end 7a, similar to the outer face 6c of the base 6a, and the easy deformation portion 7 has a configuration provided with the bending portion 7b. In a condition where the cover 1 is not attached to the bumper B, an outer face between the bending portion 7b and the free end 7a of the easy deformation portion 7 is located slightly outer side (an upper side of FIG. 9) than the outer face 6c of the base 6a of the support portion 6.

Figure 10:
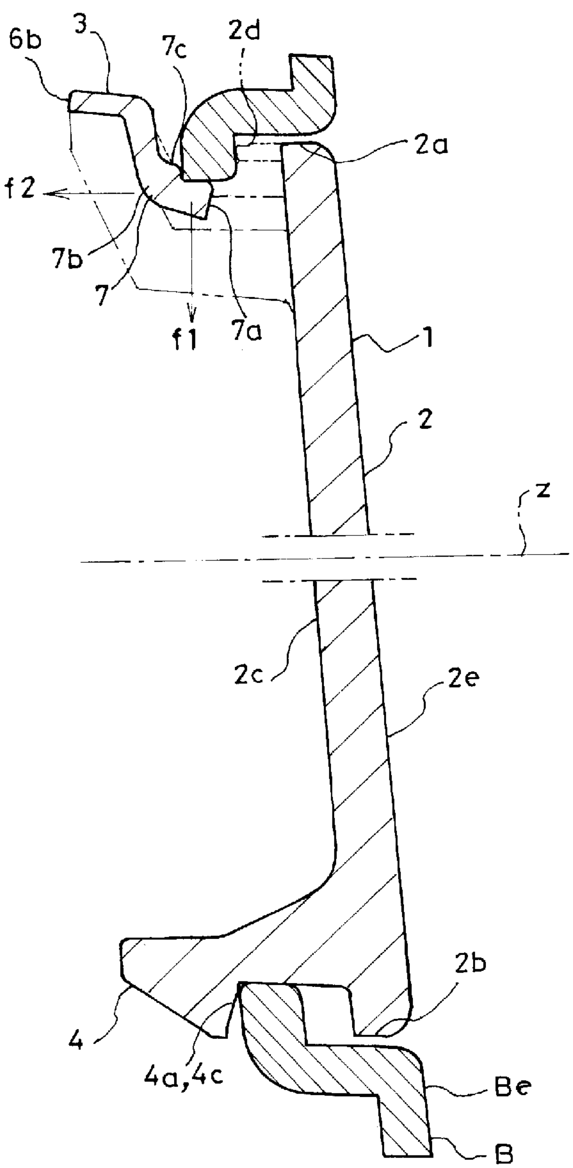
FIG. 10 is a sectional view taken along the line B-B in FIG. 6.

In the illustrated embodiment, raised portions 7c are arranged side by side with a space in the left-right direction at the bending portion 7b of the easy deformation portion 7, and the easy bending portion 7 contacts the protrusion end Bh of the surrounding edge Bg as the hole edge Baa of the opening Ba by the raised portions 7c (refer to FIG. 10). Tuning can be made by simply grinding the raised portion 7c.

The easy deformation portion 7, wherein the free end 7a is located near the inner face 2c of the cover main body 2 and by the inclination such that as it approaches the free end 7a, it comes to the center of the cover main body 2, is supported by an imaginary straight line parallel to the thickness direction of the cover main body, namely to intersect in the length direction of the easy deformation portion 7 relative to the center axis z (refer to FIG. 9 and FIG. 10) of the opening Ba, and contacts the hole edge Baa of the opening Ba in an elastic deformation condition. Accordingly, there are a force in a direction indicated as sign f1 and a force indicated as sign f2 in FIG. 10, so that the second protrusion 4 closely contacts the hole edge Baa of the opening Ba, and the cover main body 2 closely contacts the bumper B.

Also, in the configuration of the embodiment, the second protrusion 4 includes an engagement portion 4a relative to the hole edge Baa to face the hole edge Baa of the opening Ba.

In the illustrated embodiment, the engagement portion 4a of the second protrusion 4 includes an outer face 4b directed to a side opposite to the center side of the cover main body 2 in a plate arranged such that a plate face thereof is directed along the other side 2b.

The engagement portion 4a is formed by forming a raised portion forming an engagement face 4c opposing the inner face 2c of the cover main body 2 at a position in about a middle in the protrusion direction of the second protrusion 4, between the protrusion end of the second protrusion 4 and the position in said middle. A portion between the engagement face 4c in the engagement portion 4a and the protrusion end of the second protrusion 4 becomes an inclined face 4f in which a thickness is gradually reduced as it approaches the protrusion end.

In a state that the disengagement prevention portion 6b of the first protrusion 3 is introduced in a direction of the inner face B1 of the bumper B through the cutout forming the narrow width portion Bj formed near the upper edge Bb of the opening Ba, with the first protrusion 3 as a fulcrum, the other side 2b of the cover main body 2 is moved to a position abutting against the surrounding edge Bg near the lower edge Bd of the opening Ba, so that the second protrusion 4 is introduced to the opening Ba through the cutout forming the narrow width portion Bj formed near the lower edge Bd of the opening Ba, to thereby be able to attach the cover 1 to the bumper B.

More concretely, as stated above, when the portion near the other side 2b of the cover main body 2 is moved, the inclined portion 4f slidably contacts the protrusion end Bh of the surrounding edge Bg near the lower edge Bd of the opening Ba, so that the cover 1 elastically deforms in a direction to narrow a distance between the first protrusion 3 and the second protrusion 4, to thereby allow introduction of the engagement portion 4*a* of the second protrusion 4 toward an inner side of the surrounding edge Bg. When the engagement portion 4*a* is introduced into the inner side of the surrounding edge Bg, the cover 1 elastically returns, so that the engagement face 4*c* is caught from the inner face Bi of the bumper B to the surrounding edge Bg (FIG. 10).

Figure 5:
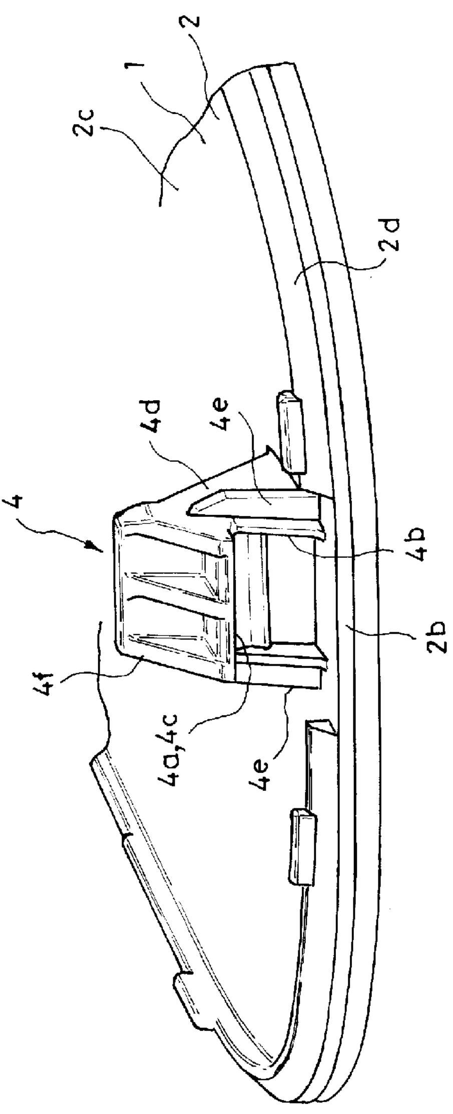
FIG. 5 is a perspective view of a forming portion of a second protrusion portion equipped in the cover.
Figure 6:
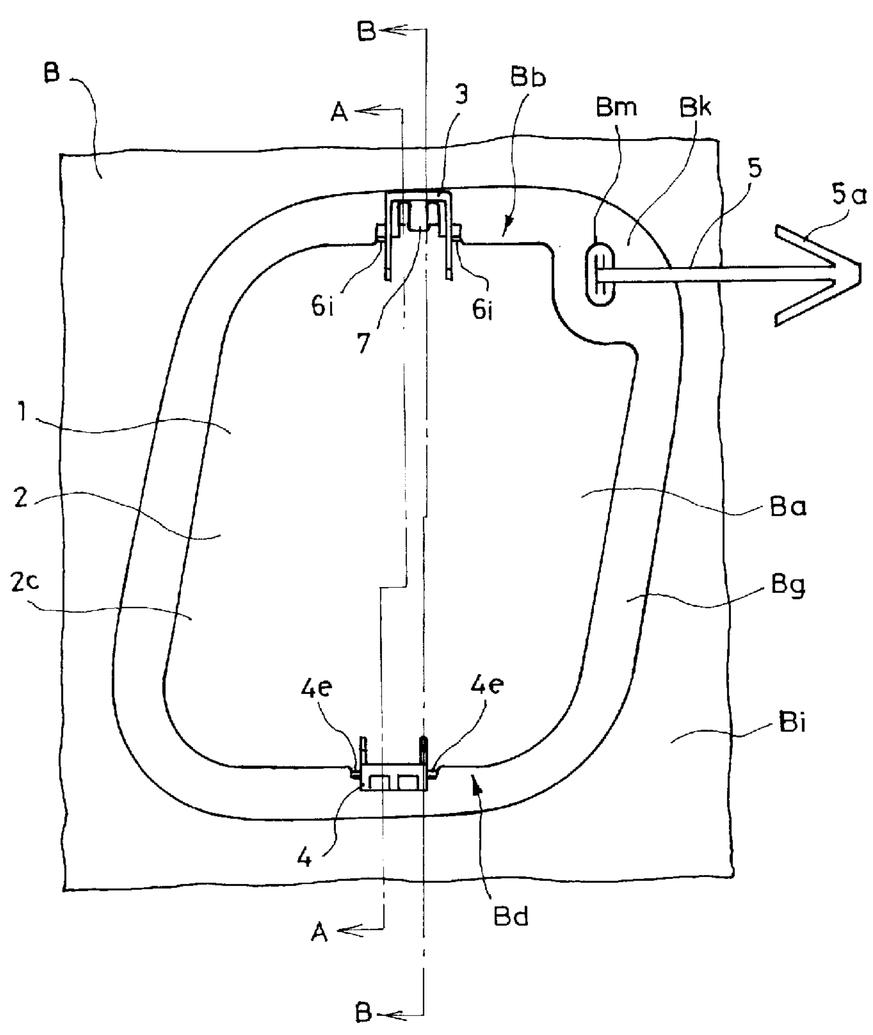
FIG. 6 is a rear view showing from an inside of the bumper in a condition where the cover is attached to the bumper.
Figure 7:
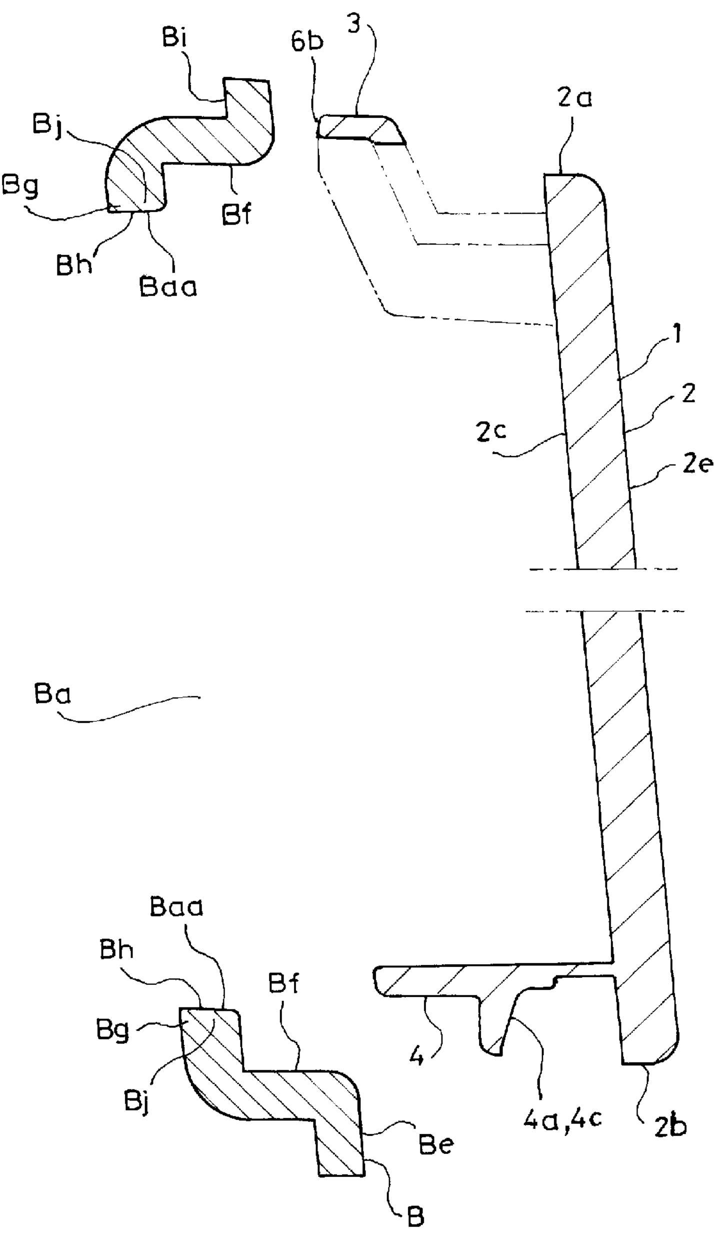
FIG. 7 is a sectional view taken along a line A-A in FIG. 6, wherein the cover just before attaching to the bumper, and the bumper are shown together.
Figure 8:
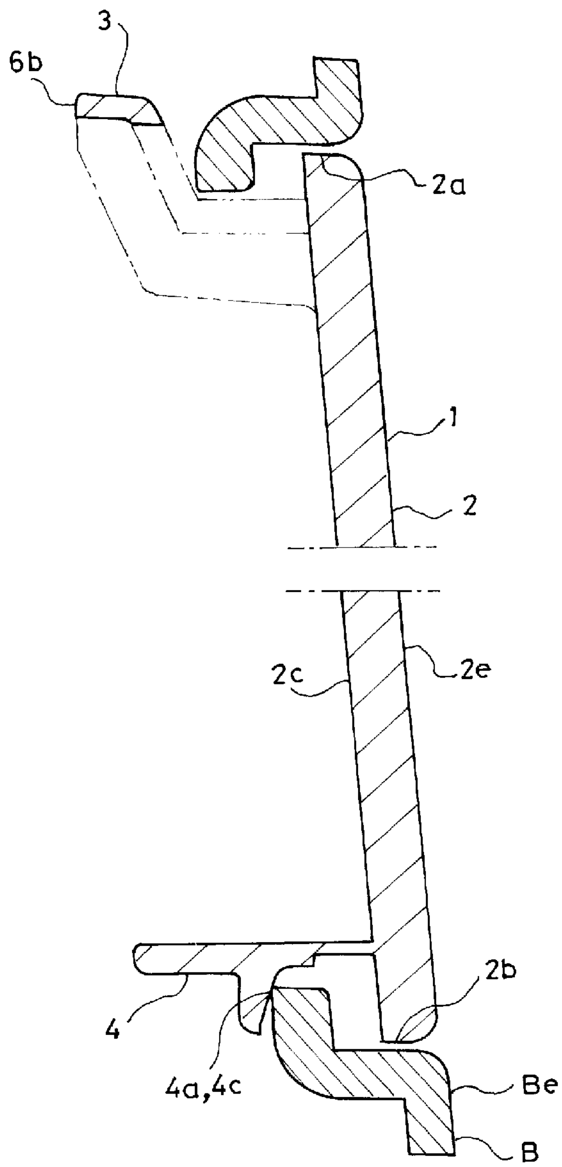
FIG. 8 is a sectional view taken along the line A-A in FIG. 6.
Figure 9:
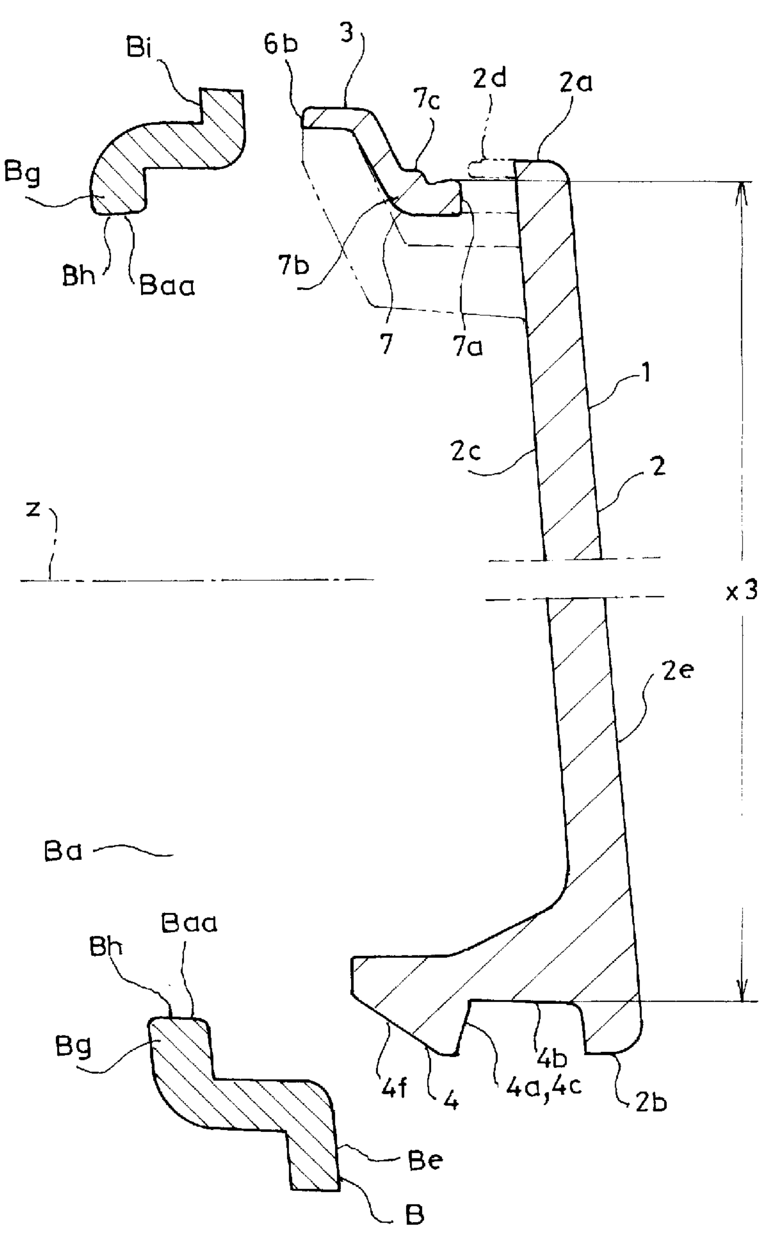
FIG. 9 is a sectional view taken along a line B-B in FIG. 6, wherein the cover just before attaching to the bumper, and the bumper are shown together.

Incidentally, in the illustrated embodiment, outside the left and right outer faces 6*h* of the base portion 6*a* of the support portion 6 of the first protrusion 3, ribs 6*i* along the protrusion direction of the base 6*a* are formed (refer to FIG. 4), and on end faces 4*d* at the left and right thickness sides in the second protrusion 4, ribs 4*a* along the projecting direction are formed (refer to FIG. 5). By these ribs 6*i* and 4*e*, the first protrusion 3 and the second protrusion 4 enter in the cutouts forming the narrow width portions Bj without a gap, so that stabilization in the left-right direction (a left-right direction in FIG. 6) of the cover is achieved.

The removal of the cover 1 from the bumper B which is done by inserting an end of a tool, such as a driver, between the surrounding portion 2*b* of the cover main body 2 and the opening Ba, and the attachment of the cover 1 to the bumper which is done by introducing the engagement portion 4*a* of the second protrusion 4 into the inside of the surrounding edge Bg, are permitted by (1) the elastic deformation of the easily deformable portion 7 of the first protrusion 7 or (2) the elastic deformation of one or both of the cover 2 and the second protrusion in addition to the elastic deformation of the easily deformable portion 7 of the first protrusion. In the illustrated embodiment, in addition to the elastic deformation of the easily deformable portion 7 of the first protrusion 3, the cover 2 is elastically deformed, so that the removable and attachment can be made.

As a matter of course, the invention is not limited to the embodiment explained above, and the invention includes all embodiments which can achieve the object of the invention.

EXPLANATION OF NUMERALS

B: Bumper
Ba: Opening
Baa: Hole edge
1: Cover
2: Cover main body
2*a*: One side
2*b*: Another side
3: First protrusion
4: Second protrusion
6: Support portion
7: Easily deformable portion Incidentally, a specification, claims, drawings and abstract of Japanese Patent Application No. 2021-133863 are all cited herein and introduced as a disclosure of the specification of the invention.

What is claimed is:

1. A cover for a bumper opening, for closing the bumper opening formed in a bumper of a vehicle, comprising:
- a cover main body,
- a first protrusion provided on one side of the cover main body and configured to be introduced into the opening, and
- a second protrusion provided on another side opposing the one side of the cover main body and configured to be introduced into the opening, wherein
- the first protrusion includes a deformable portion which is deformably made, and a support portion for the deformable portion,
- by an elastic deformation of the deformable portion to the another side by contacting the deformable portion to a hole edge of the opening, the second protrusion is closely contacted to the hole edge of the opening, and the cover main body is contacted to the bumper,
- the support portion of the first protrusion includes
  - a first portion which opposes an outer face to the hole edge of the opening and
  - a second portion facing an inner face of the bumper, and
- the deformable portion of the first protrusion includes an arm piece extending from the second portion toward the first portion, the arm piece having a free end located on a side of the first portion.

2. A cover for a bumper opening according to claim 1, wherein the support portion of the first protrusion includes a base portion configured to oppose an outer face to the hole edge of the opening, and a disengagement prevention portion which is configured to be located to face an inner face of the bumper to become disengagement prevention from the bumper.

3. A cover for a bumper opening according to claim 1, wherein the second protrusion is provided with an engagement portion which is configured to be arranged to oppose the hole edge of the opening.

4. A cover for a bumper opening according to claim 1, wherein the arm piece extends in an inclined manner.

5. A cover for a bumper opening, for closing the bumper opening formed in a bumper of a vehicle, comprising:
- a cover main body,
- a first protrusion provided on one side of the cover main body and configured to be introduced into the opening, and
- a second protrusion provided on another side opposing the one side of the cover main body and configured to be introduced into the opening,
- wherein
  - the first protrusion includes a deformable portion which is deformably made, and a support portion for the deformable portion,
  - by an elastic deformation of the deformable portion to the another side by contacting the deformable portion to a hole edge of the opening, the second protrusion is closely contacted to the hole edge of the opening, and the cover main body is contacted to the bumper,
  - the support portion of the first protrusion includes a base portion configured to oppose an outer face to the hole edge of the opening, and a disengagement prevention portion which is configured to be located to face an inner face of the bumper to become disengagement prevention from the bumper, and
  - the deformable portion of the first protrusion is an arm piece which extends in an inclined manner from the disengagement prevention portion of the support portion toward the base portion so that a free end is located on a base portion side.

* * * * *